US012587920B2

(12) United States Patent
Palakuri et al.

(10) Patent No.: US 12,587,920 B2
(45) Date of Patent: Mar. 24, 2026

(54) DETECTING PHYSICAL CELL IDENTIFIER (PCI) CONFUSION DURING SECONDARY NODE (SN) CHANGE PROCEDURE IN WIRELESS NETWORKS

(71) Applicant: Rakuten Symphony, Inc., Tokyo (JP)

(72) Inventors: Prasad Palakuri, Bangalore (IN); Collins Lourange Mariasoosei, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/690,324

(22) PCT Filed: Jan. 11, 2024

(86) PCT No.: PCT/US2024/011198
§ 371 (c)(1),
(2) Date: Mar. 8, 2024

(87) PCT Pub. No.: WO2025/048878
PCT Pub. Date: Mar. 6, 2025

(65) Prior Publication Data
US 2025/0234256 A1    Jul. 17, 2025

(30) Foreign Application Priority Data
Aug. 31, 2023    (IN) .............................. 202341058592

(51) Int. Cl.
*H04W 36/00*        (2009.01)
*H04W 74/0833*      (2024.01)

(52) U.S. Cl.
CPC ... *H04W 36/0079* (2018.08); *H04W 74/0833* (2013.01)

(58) Field of Classification Search
CPC ...................... H04W 36/0079; H04W 74/0833
See application file for complete search history.

(56) References Cited

U.S. PATENT DOCUMENTS 9,301,218 B1 *    3/2016    Sitaram ........... H04W 36/00835
11,711,780 B2 *   7/2023    Agarwal ............. H04W 64/003
                                                        370/329
(Continued)

FOREIGN PATENT DOCUMENTS

KR        2035214 B1 * 11/2019  ............. H04L 69/28

OTHER PUBLICATIONS

Written Opinion mailed May 27, 2024 in International Patent Application No. PCT/US2024/011198.
(Continued)

*Primary Examiner* — Chuong M Nguyen
(74) *Attorney, Agent, or Firm* — Sughrue Mion, PLLC

(57)                ABSTRACT

Embodiments of the present disclosure disclose first secondary node element (203-1) for detecting Physical Cell Identifier (PCI) confusion during Secondary Node (SN) change procedure. The first secondary node element (203-1) receives Secondary Cell Group (SCG) failure information from UE (201) during handover from first secondary node element (203-1) to second secondary node element (203-2), indicating cause of failure of handover as Random Access Channel failure. The first secondary node element (203-1) suspects that failure is due to PCI confusion associated with PCI of second secondary node element (203-2), based on cause, within pre-determined time period of timer configured at primary node element (202) for holding context of UE (201) at first secondary node element (203-1). The first secondary node element (203-1) performs mitigation action during subsequent handover from to secondary node elements, for UEs in wireless network, when PCI of one of secondary node elements is same as suspected PCI.

17 Claims, 9 Drawing Sheets

(56)  References Cited

U.S. PATENT DOCUMENTS

| 2016/0381608 | A1 |    | 12/2016 | Marinier et al. |  |
|---|---|---|---|---|---|
| 2018/0070247 | A1 |    | 3/2018 | Gormley et al. |  |
| 2018/0359700 | A1 | * | 12/2018 | Sasanapuri | H04L 5/0057 |
| 2019/0098541 | A1 | * | 3/2019 | Peng | H04W 36/0016 |
| 2019/0141541 | A1 | * | 5/2019 | Futaki | H04W 24/02 |
| 2020/0374770 | A1 | * | 11/2020 | Vivanco | H04W 24/02 |
| 2020/0383016 | A1 | * | 12/2020 | Chen | H04W 36/0058 |
| 2020/0413473 | A1 | * | 12/2020 | Susitaival | H04W 76/25 |
| 2022/0007440 | A1 |    | 1/2022 | Vaidya et al. |  |
| 2022/0353936 | A1 | * | 11/2022 | Shen | H04W 80/02 |
| 2023/0109338 | A1 |    | 4/2023 | Ma et al. |  |

OTHER PUBLICATIONS

International Search Report mailed May 27, 2024 in International Patent Application No. PCT/US2024/011198.

* cited by examiner

300

FIRST SECONDARY NODE ELEMENT 203-1

I/O INTERFACE 301     MEMORY 302     PROCESSOR 303

DATA 304

INPUT DATA 306     FAILURE DATA 307

MITIGATION DATA 308     OTHER DATA 309

MODULES 305

INPUT MODULE 310     FAILURE SUSPECT MODULE 311

MITIGATION PERFORM MODULE 312     OTHER MODULES 313

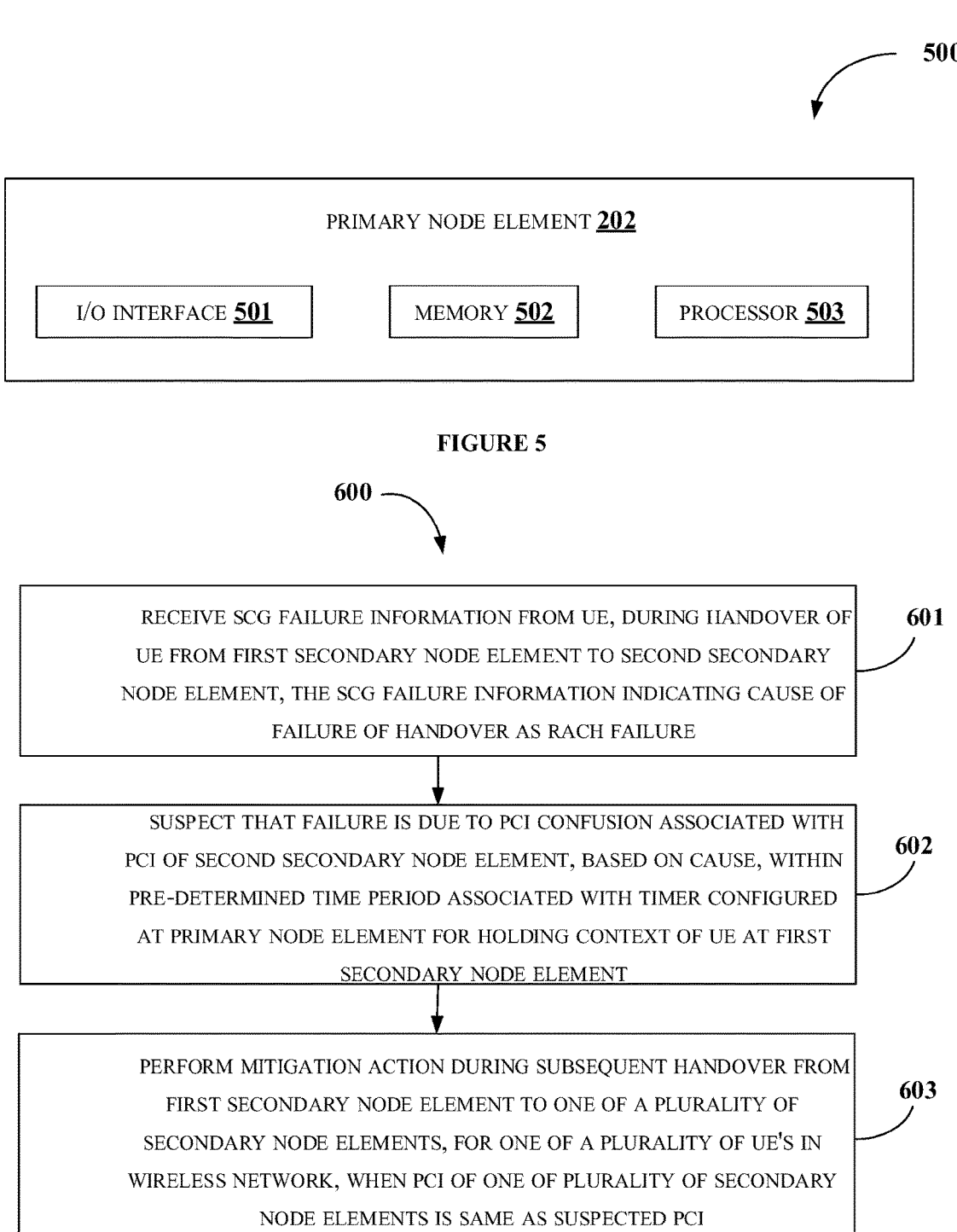

500

PRIMARY NODE ELEMENT 202

I/O INTERFACE 501    MEMORY 502    PROCESSOR 503

RECEIVE SCG FAILURE INFORMATION FROM UE, DURING HANDOVER OF UE FROM FIRST SECONDARY NODE ELEMENT TO SECOND SECONDARY NODE ELEMENT, THE SCG FAILURE INFORMATION INDICATING CAUSE OF FAILURE OF HANDOVER AS RACH FAILURE    601

SUSPECT THAT FAILURE IS DUE TO PCI CONFUSION ASSOCIATED WITH PCI OF SECOND SECONDARY NODE ELEMENT, BASED ON CAUSE, WITHIN PRE-DETERMINED TIME PERIOD ASSOCIATED WITH TIMER CONFIGURED AT PRIMARY NODE ELEMENT FOR HOLDING CONTEXT OF UE AT FIRST SECONDARY NODE ELEMENT    602

PERFORM MITIGATION ACTION DURING SUBSEQUENT HANDOVER FROM FIRST SECONDARY NODE ELEMENT TO ONE OF A PLURALITY OF SECONDARY NODE ELEMENTS, FOR ONE OF A PLURALITY OF UE'S IN WIRELESS NETWORK, WHEN PCI OF ONE OF PLURALITY OF SECONDARY NODE ELEMENTS IS SAME AS SUSPECTED PCI    603

FIGURE 6A

DETECTING PHYSICAL CELL IDENTIFIER (PCI) CONFUSION DURING SECONDARY NODE (SN) CHANGE PROCEDURE IN WIRELESS NETWORKS

CROSS REFERENCE TO RELATED APPLICATIONS

This application is a National Stage of International Application No. PCT/US2024/011198 filed Jan. 11, 2024, claiming priority based on Indian Patent Application No. 202341058592 filed Aug. 31, 2023.

TECHNICAL FIELD

The present disclosure generally relates to the field of wireless communication networks. More particularly, the present disclosure relates to detecting Physical Cell Identifier (PCI) confusion during Secondary Node (SN) change procedure in wireless networks.

BACKGROUND

Wireless communication networks such as a Fifth Generation (5G) network has a wide range of applications and services due to its various advantages such as greater speeds, reduced latency, and the like. The 5G network is continuously evolving and newer technologies are implemented to improvise the 5G network. One such technology is 5G New Radio Evolved-Universal Terrestrial Radio Access-New Radio (E-UTRAN) Dual connectivity (5G NR EN-DC). The 5G NR EN-DC allows a User Equipment (UE) to exchange data between itself and 5G NR base station along with simultaneous connection with Long Term Evolution (LTE)/Fourth Generation (4G) base station. An interworking between the LTE and 5G NR base stations is established. The 5G NR EN-DC allows the UE to leverage benefits of both the technologies such as higher speeds, increased bandwidth, and the like.

In 5G NR EN-DC, LTE node elements work as anchor/master node elements, and the UE performs initial registration to the master node elements. 5G NR node elements work as secondary node elements associated with the master node elements and communicate with the UE via the master node elements. Hence, the UE is connected to a master node element and a secondary node element to communicate over the network. Generally, there may be a requirement to change the secondary node element due to various reasons such as poor network conditions of the current secondary node element. This is termed as Secondary Node (SN) change procedure where a handover is performed from the current secondary node element to another secondary node element in the network. However, various kinds of failure occur during the SN change procedure. Hence, there is a requirement to detect such failures and take necessary actions, for efficiently facilitating the handover which improves user experience.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a first secondary node element. The first secondary node element comprises a processor and a memory. The processor is configured to receive Secondary Cell Group (SCG) failure information from a User Equipment (UE) via a primary node element, during a handover of the UE from the first secondary node element to a second secondary node element. The SCG failure information indicates a cause of a failure of the handover as a Random Access Channel (RACH) failure. Further, the processor is configured to suspect that the failure is due to a Physical Cell Identifier (PCI) confusion associated with a PCI of the second secondary node element, based on the cause. The processor suspects that the failure is due to the PCI confusion within a pre-determined time period associated with a timer configured at the primary node element for holding context of the UE at the first secondary node element. Thereafter, the processor is configured to perform a mitigation action during a subsequent handover from the first secondary node element to one of a plurality of secondary node elements, for one of a plurality of UEs in a wireless network, when a PCI of one of the plurality of secondary node elements is same as the suspected PCI.

In an embodiment, the present disclosure discloses a primary node element. The primary node element comprises a processor and a memory. The processor configures a timer to hold context of a User Equipment (UE) at a first secondary node element for a pre-determined time period, during a handover of the UE from a first secondary node element to a second secondary node element. Further, the processor receives Secondary Cell group (SCG) failure information from the UE. The SCG failure information indicates a cause of a failure of the handover as a Random Access Channel (RACH) failure. Further, the processor transmits the SCG failure information to the first secondary node element. The first secondary node element uses the SCG failure information to suspect that the failure is due to a Physical Cell Identifier (PCI) confusion and perform a mitigation action during a subsequent handover from the first secondary node element to one of a plurality of secondary node elements, for one of a plurality of UEs in a wireless network.

In an embodiment, the present disclosure discloses a method. The method comprises receiving Secondary Cell Group (SCG) failure information from a User Equipment (UE) via a primary node element, during a handover of the UE from the first secondary node element to a second secondary node element. The SCG failure information indicating a cause of a failure of the handover as a Random Access Channel (RACH) failure. Further, the method comprises suspecting that the failure is due to a Physical Cell Identifier (PCI) confusion associated with a PCI of the second secondary node element, based on the cause. The failure is suspected within a pre-determined time period associated with a timer configured at the primary node element for holding context of the UE at the first secondary node element. Thereafter, the method comprises performing a mitigation action during a subsequent handover from the first secondary node element to one of a plurality of secondary node elements, for one of a plurality of UEs in a wireless network, when a PCI of one of the plurality of secondary node elements is same as the suspected PCI.

In an embodiment, the present disclosure discloses a non-transitory computer readable medium. The non-transitory computer readable medium includes instructions for performing operations comprising receiving Secondary Cell Group (SCG) failure information from a User Equipment (UE) via a primary node element, during a handover of the UE from the first secondary node element to a second secondary node element. The SCG failure information indicating a cause of a failure of the handover as a Random Access Channel (RACH) failure. Further, the operations comprise suspecting that the failure is due to a Physical Cell Identifier (PCI) confusion associated with a PCI of the second secondary node element, based on the cause. The failure is suspected within a pre-determined time period associated with a timer configured at the primary node element for holding context of the UE at the first secondary node element. Thereafter, the operations comprise performing a mitigation action during a subsequent handover from the first secondary node element to one of a plurality of secondary node elements, for one of a plurality of UEs in a wireless network, when a PCI of one of the plurality of secondary node elements is same as the suspected PCI.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 5 illustrates a diagram of a primary node element for detecting PCI confusion during SN change procedure in wireless networks, in accordance with some embodiments of the present disclosure;

FIG. 6A shows an exemplary flow chart illustrating method steps for detecting PCI confusion during SN change procedure in wireless networks, in accordance with some embodiments of the present disclosure;

Figure 1A:
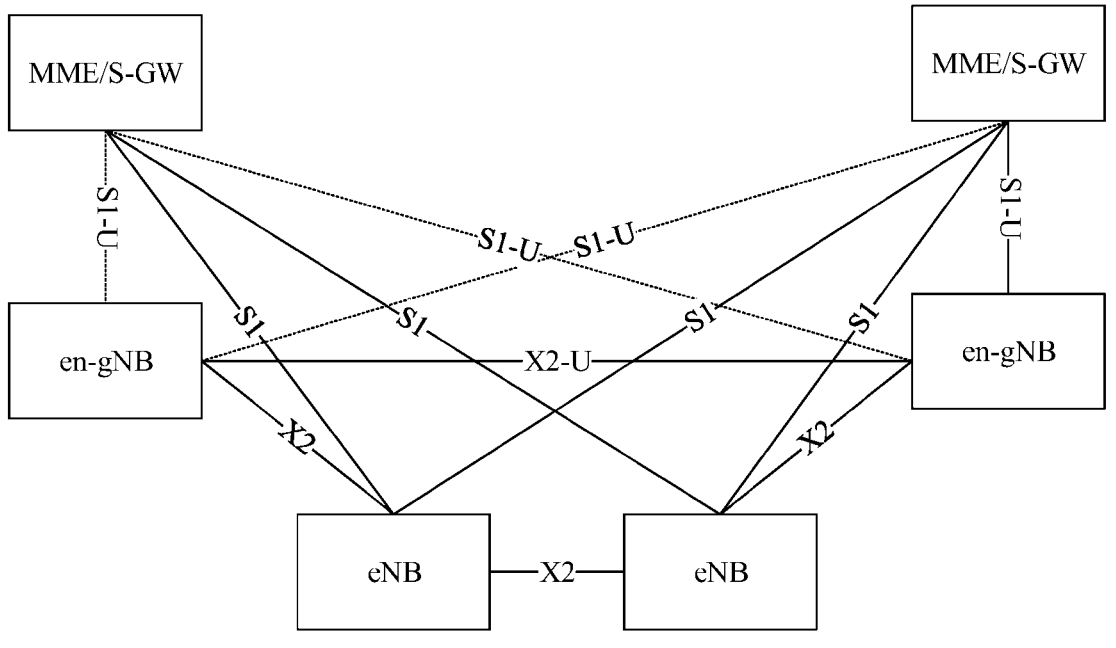
FIG. 1A illustrates a 5G New Radio Evolved-Universal Terrestrial Radio Access-New Radio (E-UTRAN) Dual connectivity (5G NR EN-DC) architecture.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

FIG. 1A illustrates a 5G New Radio Evolved-Universal Terrestrial Radio Access-New Radio (E-UTRAN) Dual connectivity (5G NR EN-DC) architecture. The 5G NR EN-DC allows a User Equipment (UE) to exchange data between itself and 5G node elements along with simultaneous connection with Long-Term Evolution (LTE) node elements. There is an interworking between the LTE node elements and the 5G node elements. As shown in FIG. 1A, the 5G NR EN-DC architecture comprises an Evolved Packet Core (EPC) or a core network (illustrated as including a Mobility Management Entity (MME)/Serving Gateway (SGW)), multiple Evolved Node Bs (eNBs) or LTE node elements, and multiple NR eNBs (en-gNBs) or 5G node elements. In the 5G NR EN-DC, the eNBs are also termed as master node elements. The master node elements provide a control plane connection to the core network i.e., the master node elements communicate data and control information with the core network. The en-gNBs are termed as secondary node elements. The secondary node elements do not have a control plane connection to the core network. The secondary node elements provide additional resources required by the UE. The UE is connected to an eNB that acts as a Master Node (MN) and an en-gNB that acts as a Secondary Node (SN). The eNB is connected to the EPC via a S1 interface and to the en-gNB via a X2 interface. The en-gNB is connected to the EPC via a S1-U interface and other en-gNB via a X2-U interface.

Figure 1B:
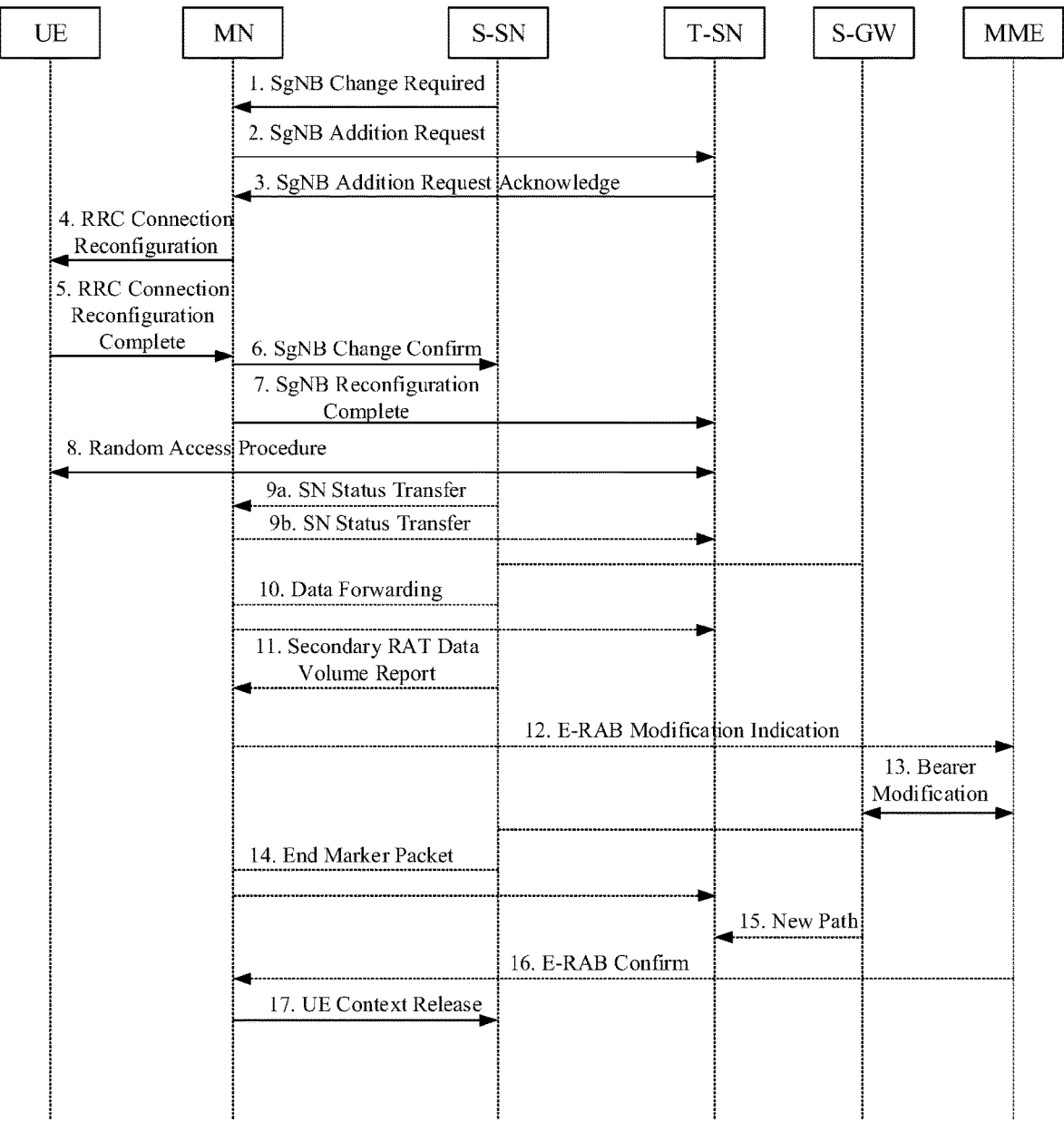
FIG. 1B illustrates a conventional Secondary Node (SN) change procedure.

Generally, there may be a requirement to change the SN connected to the UE due to various reasons such as poor network conditions of the current SN. The procedure performed for a change from the current SN to another SN in a wireless network is termed as Secondary Node (SN) change procedure. A handover is performed from the current SN to another SN in the wireless network. FIG. 1B illustrates a conventional SN change procedure. In FIG. 1B, the current SN is illustrated as a Source SN (S-SN) and the other SN to which a handover is required to be performed is illustrated as a Target SN (T-SN). The conventional SN change procedure is explained briefly as follows. At step 1, the S-SN determines whether a change in the SN is required based on a measurement report received from the UE. In an example, the measurement report may indicate poor network conditions of the S-SN. The S-SN indicates a requirement of a SN change to the MN. The MN initiates the SN change procedure with the T-SN and performs Radio Resource Control (RRC) reconfiguration with the T-SN at steps 2-7. Then, the UE performs random access procedure at step 8, followed by which a bearer is modified for connecting the UE to the T-SN. The context of the UE stored at the S-SN is released to complete the handover from the S-SN to the T-SN. The conventional SN change procedure is not explained in detail, as it is well-known in the art.

During the above-stated SN change procedure, there may be a failure of handover from the S-SN to the T-SN for various reasons. One such reason may include a New Radio Physical Cell Identifier confusion (NR-PCI confusion) (also referred as PCI confusion in the present description). The PCI confusion occurs when two neighbour cells of same en-gNB or different en-gNBs are associated with same Physical Cell Identifier (PCI). PCI is an identification of a cell at physical layer. Due to the PCI confusion, the handover may be triggered towards an incorrect en-gNB. For instance, there may be one or more en-gNBs with same PCI as the en-gNB indicated by the UE to perform the handover. This leads to a failure of the handover. In the conventional SN change procedure, such PCI confusion is undetected. Hence, the S-SN is not aware that the failure is due to the PCI confusion. Accordingly, the S-SN cannot perform any mitigation actions to avoid such failures during future handovers from the S-SN to T-SNs. The present disclosure provides a secondary node element with an ability to detect that the failure is due to the PCI confusion and perform mitigation actions to avoid such failures during the future handovers of UEs in the wireless network.

Figure 2:
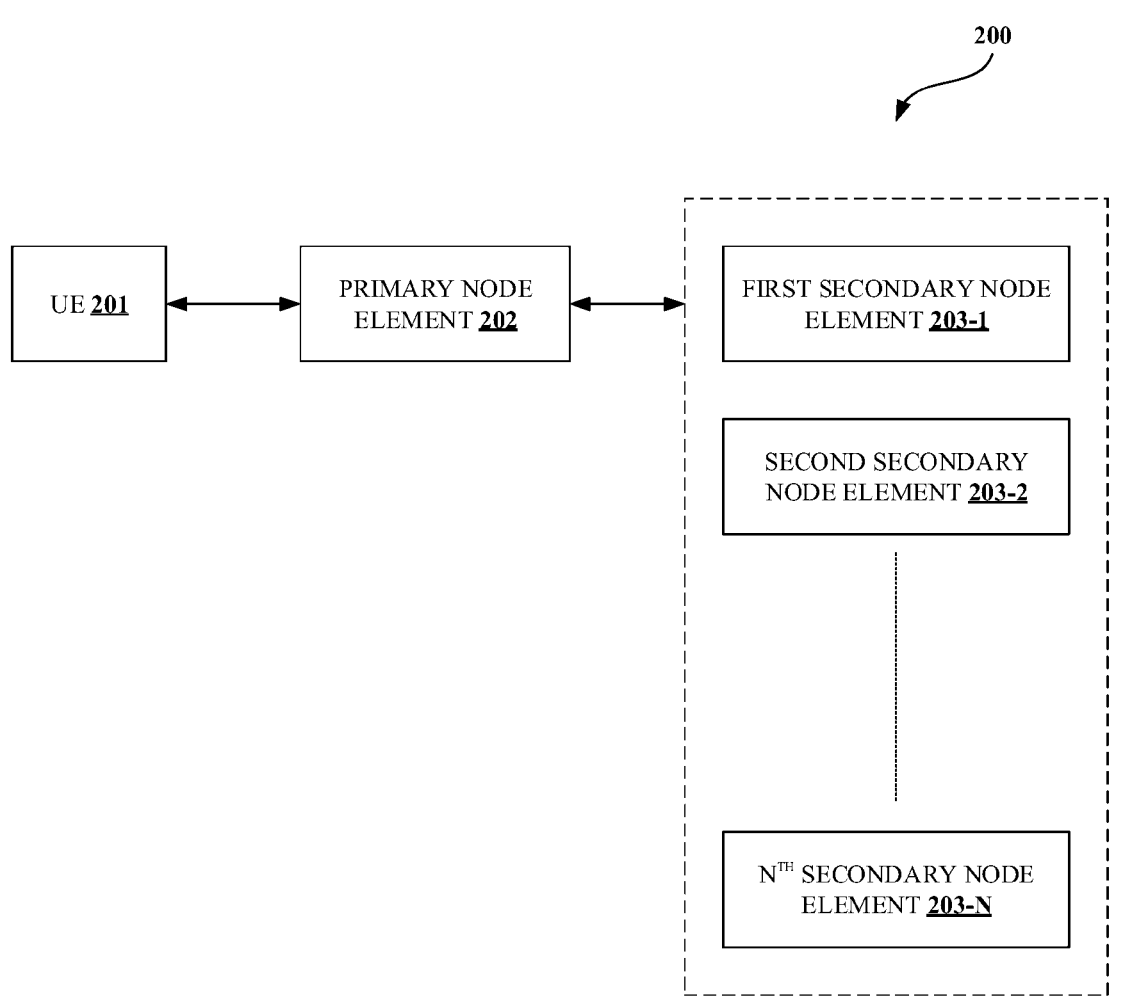
FIG. 2 illustrates an exemplary environment for detecting PCI confusion during SN change procedure in wireless networks, in accordance with some embodiments of the present disclosure.

FIG. 2 illustrates an exemplary environment 200 of detecting the PCI confusion during the SN change procedure in wireless networks, in accordance with embodiments of the present disclosure. The exemplary environment 200 comprises a User Equipment (UE) 201, a primary node element 202, and a plurality of secondary node elements 203-1, 203-2, . . . , 203-N (collectively referred to as the plurality of secondary node elements 203). The UE 201 is configured to connect over the wireless network comprising the primary node element 202 and the plurality of secondary node elements 203. Examples of the UE 201 include, but not limited to, any device used by a user to communicate and/or access content such as, but not limited to, mobile phones, smartphones, laptops, wearables, Internet of Tings (IoTs), and the like. The UE 201 is connected to the primary node element 202. The primary node element 202 (also referred to as eNB) may be an LTE or a Fourth Generation (4G) node element. The primary node element 202 provides a control plane connection to a core network i.e., the primary node element 202 communicates data and control information with the core network. The primary node element 202 is also referred as a master node element. Further, the UE 201 is connected to a secondary node element from the plurality of secondary node elements 203. Each of the plurality of secondary node elements 203 is a 5G node element. The plurality of secondary node elements 203 do not have a control plane connection to the core network. The plurality of secondary node elements 203 provide additional resources required by the UE 201. The plurality of secondary node elements 203 form a Secondary Cell Group (SCG) in the wireless network. In the present disclosure, the secondary node element connected to the UE 201 is referred as the first secondary node element 203-1. During the SN change procedure, the first secondary node element 203-1 and the UE 201 may communicate with each other, via the primary node element 202.

In the present disclosure, the first secondary node element 203-1 is configured to detect the PCI confusion during the SN change procedure in the wireless network. The first secondary node element 203-1 connected to the UE 201 may determine that a SN change is required based on a measurement report received from the UE 201. Accordingly, the first secondary node element 203-1 may initiate the SN change procedure for handover from the first secondary node element 203-1 to another secondary node element (referred as the second secondary node element 203-2 in the present description). The first secondary node element 203-1 receives a SCG failure information indicating a failure of handover from the first secondary node element 203-1 to the second secondary node element 203-2. In the present disclosure, the SCG failure information indicates a cause of the failure of the handover as a Random Access Channel (RACH) failure. This helps the first secondary node element 203-1 to suspect that the failure may be due to the PCI confusion. The PCI confusion occurs when two neighbour cells or en-gNBs are associated with same Physical Cell Identifier (PCI). PCI is an identification of a cell at physical layer.

In the present disclosure, a timer is configured at the primary node element 202. The first secondary node element 203-1 suspects that the failure is due to the PCI confusion associated with a PCI of the second secondary node element 203-2, within a pre-determined time period associated with the timer. The timer ensures that the context of the UE 201 is held until the first secondary node element 203-1 suspects the failure. The first secondary node element 203-1 stores the PCI associated with the PCI confusion, such that a mitigation action is performed during subsequent handovers in the wireless network. Hence, the present disclosure enables the first secondary node element 203-1 to perform the mitigation action during a subsequent handover from the first secondary node element (203-1) to one of the plurality of secondary node elements 203, for UEs in the wireless network, when a PCI of one of the plurality of secondary node elements 203 is same as the suspected PCI.

Figure 3:
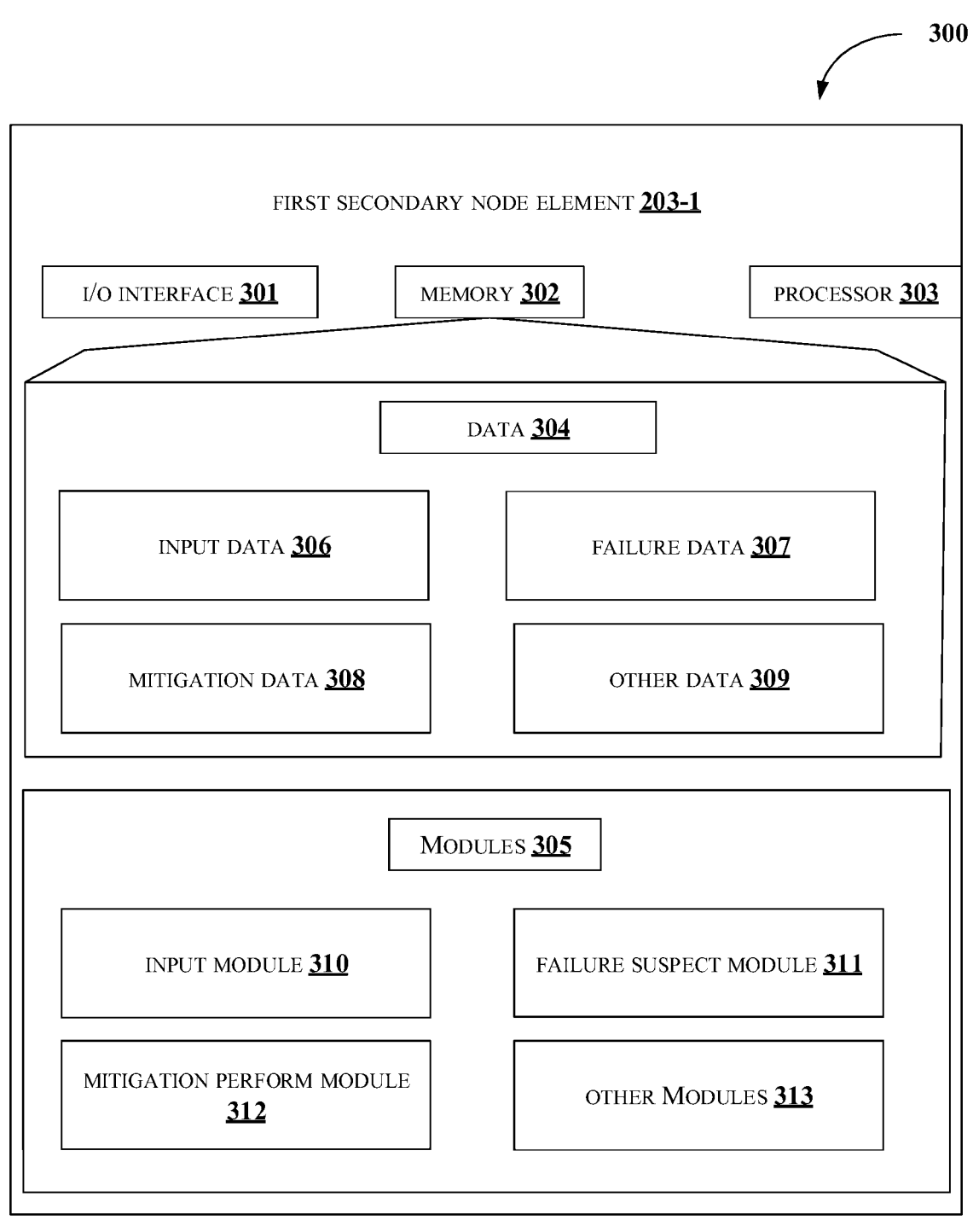
FIG. 3 illustrates a detailed diagram of a first secondary node element for detecting PCI confusion during SN change procedure in wireless networks, in accordance with some embodiments of the present disclosure.

FIG. 3 illustrates a detailed diagram of the first secondary node element 203-1 for detecting the PCI confusion during the SN change procedure in the wireless network, in accordance with some embodiments of the present disclosure. The first secondary node element 203-1 may include Input/Output (I/O) interface 301, a memory 302, and a Central Processing Unit (also referred as "CPU" or "a processor 303"). In some embodiments, the memory 302 may be communicatively coupled to the processor 303. The memory 302 stores instructions executable by the processor 303. The processor 303 may comprise at least one data processor for executing program components for executing user or system-generated requests. The memory 302 may be communicatively coupled to the processor 303. The memory 302 stores instructions, executable by the processor 303, which, on execution, may cause the processor 303 to detect the PCI confusion during the SN change procedure in the wireless network. The I/O interface 301 is coupled with the processor 303 through which an input signal or/and an output signal is communicated. For example, the SCG failure information may be received from the primary node element 202, via the I/O interface 301. In an embodiment, the first secondary node element 203-1 may be implemented in a variety of computing systems, such as a server, a network server, a cloud-based server, and the like.

In an embodiment, the memory 302 may include one or more modules 305 and data 304. The one or more modules 305 may be configured to perform the steps of the present disclosure using the data 304, to detect the PCI confusion during the SN change procedure in the wireless network. In an embodiment, each of the one or more modules 305 may be a hardware unit which may be outside the memory 302 and coupled with the first secondary node element 203-1. As used herein, the term modules 305 refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 305 when configured with the described functionality defined in the present disclosure will result in a novel hardware.

In one implementation, the modules 305 may include, for example, an input module 310, a failure suspect module 311, a mitigation module 312, and other modules 313. It will be appreciated that such aforementioned modules may be represented as a single module or a combination of different modules. In one implementation, the data 304 may include, for example, input data 306, failure data 307, mitigation data 308, and other data 309.

In an embodiment, the input module 310 may be configured to receive SCG failure information from the UE 201 via the primary node element 202. The input module 310 may receive the SCG failure information when a handover from the first secondary node element 203-1 to the second secondary node element 203-2 fails. Herein, firstly, a secondary node element from the plurality of secondary node elements 203 may be identified by the UE 201 for performing the handover. The secondary node element may be identified based on one or more network parameters associated with each of the plurality of secondary node elements 203. For instance, the secondary node element with a highest signal strength among the plurality of secondary elements 203 may be identified. The first secondary node element 203-1 may initiate the handover from the first secondary node element 203-1 to the second secondary node element 203-2.

Figure 4A:
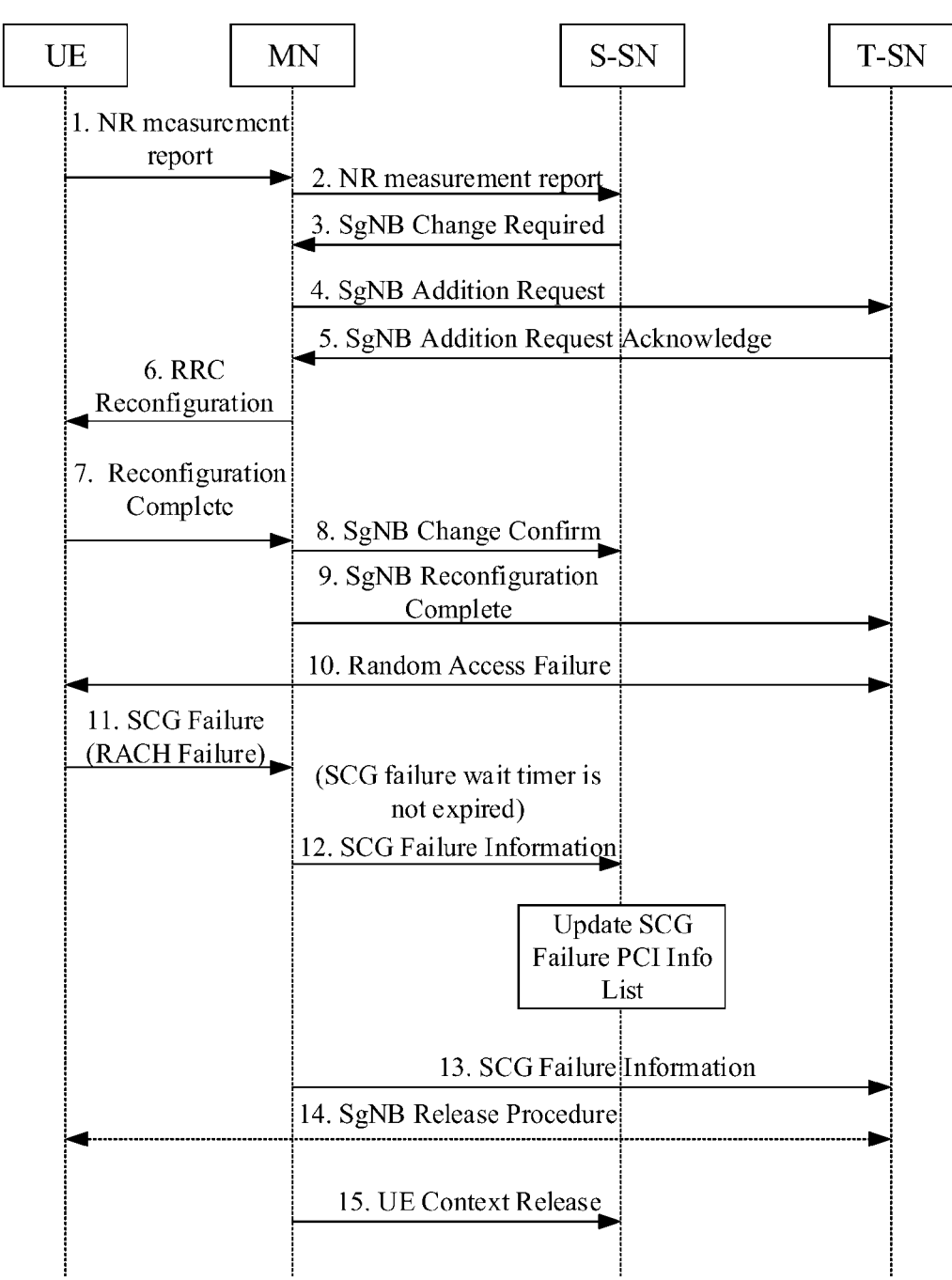
FIGS. 4A-4B show exemplary illustrations for detecting PCI confusion during SN change procedure in wireless networks, in accordance with some embodiments of the present disclosure.

A random access procedure may be performed by the UE 201 for handover from the first secondary node element 203-1 to the second secondary node element 203-2, which may fail due to various reasons. Then, the input module 310 may receive the SCG failure information from the UE 201. In the present disclosure, the input module 310 may receive the SCG failure information indicating a cause of the failure as a RACH failure. The RACH failure indicates that the UE is not able to synchronize with the wireless network. Referring to FIG. 4A, the SN change procedure according to the embodiments of the present disclosure is illustrated. At steps 1 and 2, the SN change is initiated. At step 10, a random-access failure is noticed when the handover is performed from the first secondary node element 203-1 to the second secondary node element 203-2 as indicated in the steps 3-9. At step 11, the UE 201 transmits the SCG failure information indicating the cause of the failure as the RACH failure to the primary node element 202. At step 12, the input module 310 receives the SCG failure information from the primary node element 202. Referring back to FIG. 3, the SCG failure information indicating the RACH failure may be stored as the input data 306 in the memory 302. Embodiments of the present disclosure enables the reception of the SCG failure to the first secondary node element 203-1 along with the cause of the failure as the RACH failure, which helps to detect the failure.

In an embodiment, the failure suspect module 311 may be configured to receive the input data 306 from the input module 310. Further, the failure suspect module 311 may be configured to suspect that the failure is due to the PCI confusion associated with the PCI of the second secondary node element 203-1. The failure suspect module 311 may determine that the SCG failure information indicates the cause of the failure as the RACH failure. The cause of failure as the RACH failure provides an indication to the failure suspect module 311 that the failure is due to the PCI confusion. Accordingly, the failure suspect module 311 may suspect that the failure is due to the PCI confusion, based on the cause. In an embodiment, the failure suspect module 311 may be configured to suspect that the failure is due to the PCI confusion, within a pre-determined time period associated with a timer. The timer may be configured at the primary node element 202 for holding context of the UE 201. In an embodiment, the timer may be configured once a SgNB reconfiguration process is completed. In the conventional SN change procedure, the context of the UE 201 is released before completion of the random access procedure by the UE 201. The present disclosure enables configuration of the timer at the primary node element 202 for holding the context of the UE 201. The failure suspect module 311 may be configured to suspect the failure within the pre-determined time period to ensure that the failure is suspected prior to releasing the context of the UE 201. In an example, the pre-determined time period may be in a range of 100 ms to 5000 ms.

In an embodiment, the failure suspect module 311 may be configured to record the PCI confusion against the PCI of the second secondary node element 203-2 in a Neighbor Relation Table (NRT) of the first secondary node element 203-1. The NRT maintains a list of neighbor cells along with identifiers such as PCI and Cell Global Identifier (CGI) of the neighbor cells. Referring back to FIG. 4A, the failure suspect module 311 updates the NRT (SCG failure PCI Info List) with the PCI of the second secondary node element 203-2. SgNB Release procedure and UE context release is performed after suspecting the failure, at steps 14 and 15. Referring back to FIG. 3, in an example, consider that the UE generates the measurement report and indicates that gNB 1 with PCI as '2' as a target secondary node element. However, due to the PCI confusion, gNB 3 may be associated with same PCI i.e., '2'. In such case, the first secondary node element 203-1 may identify the gNB 3 as the second secondary node element 203-2, due to which a failure occurs. The failure suspect module 311 may record that the PCI of 2 is associated with the PCI confusion in the NRT. Data related to suspecting the failure may be stored as the failure data 307 in the memory 302. Embodiments of the present disclosure enables suspecting that the failure is due to the PCI confusion, which helps to avoid such failure for future handover. Further, embodiments of the present disclosure enables configuration of the timer at the primary node element 202 to ensure that the failure is suspected as the PCI confusion prior to releasing the context of the UE 201. Also, embodiments of the present disclosure ensure that the PCI being associated with the PCI confusion is recorded in the NRT to take necessary actions when such PCI occurs during future handovers.

In an embodiment, the mitigation module 312 may be configured to receive the failure data 307 from the failure suspect module 311. Further, the mitigation module 312 may be configured to perform a mitigation action during a subsequent handover from the first secondary node element 203-1 to one of the plurality of secondary node elements 203, for one of the plurality of UEs in a wireless network. When a request is received for subsequent handover from the first secondary node element 203-1 to one or the plurality of secondary node elements 203, the mitigation module 312 may determine the PCI of one of the plurality of secondary node elements 203. The mitigation module 312 may determine that the PCI of one of the plurality of secondary node elements 203 is same as the suspected PCI.

Figure 4B:
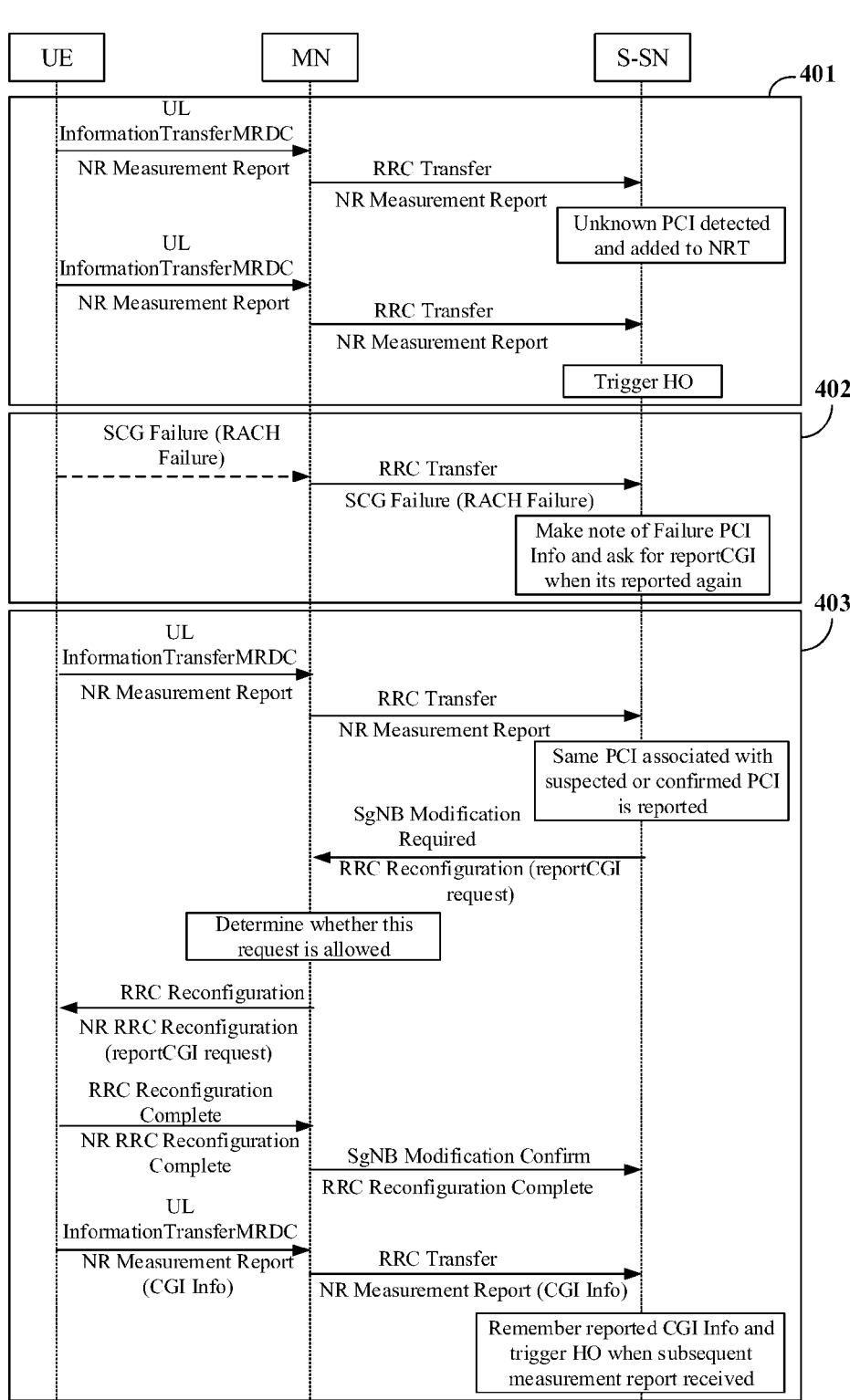

In such case, the mitigation module 312 may request a Cell Global Identifier (CGI) for performing the subsequent handover, from one of the plurality of UEs, as the PCI is associated with the PCI confusion. Typically, the CGI is used for identifying cells in a network globally. The mitigation module 312 may receive the CGI from one of the plurality of UEs, via the primary node element 202. Further, the mitigation module 312 may compare a CGI associated with the suspected PCI against the received CGI, upon receiving a response from one of the plurality of UEs. The mitigation module 312 may detect that the failure is due to the PCI confusion, when the received CGI is different from the CGI associated with the suspected PCI. Referring to FIG. 4B, the handover is initiated at steps indicated using 401. The failure is suspected, and the same PCI associated with suspected or confirmed PCI is recorded at steps indicated using 402. The failure is detected as the PCI confusion by receiving CGI from the UE 201 at steps indicated using 403. Embodiments of the present disclosure enable detecting of the PCI confusion by receiving the CGI from one of the plurality of UEs. This improves performance of the wireless networks, as detection of the PCI confusion enables performing the mitigation action to avoid failures during future handovers. In result, this improves quality of service to end users.

Referring back to FIG. 3, in an embodiment, the mitigation module 312 may be configured to perform the mitigation action during the subsequent handover of one of the plurality of UEs. Herein, the mitigation module 312 may request the CGI for performing the subsequent handover, from one of the plurality of UEs, via the primary node element 202. Then, the mitigation module 312 may identify a secondary node element corresponding to the CGI, from the plurality of secondary node elements 203. Further, mitigation module 312 may perform the subsequent handover from the first secondary node element 203-1 to the secondary node element. Thus, in the present disclosure, when a future handover request associated with the suspected PCI is received, the CGI is received from one of the plurality of UEs to directly identify the actual secondary node element, as the PCI is associated with the PCI confusion.

The other data 309 may store data, including temporary data and temporary files, generated by the one or more modules 305 for performing the various functions of the first secondary node element 203-1. The other data 309 may be stored in the memory 302. The one or more modules 305 may also include the other modules 313 to perform various miscellaneous functionalities of the first secondary node element 203-1.

FIG. 5 illustrates a diagram of the primary node element 202 for detecting the PCI confusion during the SN change procedure in the wireless network, in accordance with some embodiments of the present disclosure. The primary node element 202 may include Input/Output (I/O) interface 501, a memory 502, and a Central Processing Unit (also referred as "CPU" or "a processor 503"). In some embodiments, the memory 502 may be communicatively coupled to the processor 503. The memory 502 stores instructions executable by the processor 503. The processor 503 may comprise at least one data processor for executing program components for executing user or system-generated requests. The memory 502 may be communicatively coupled to the processor 503. The memory 502 stores instructions, executable by the processor 503, which, on execution, may cause the processor 503 to detect the PCI confusion during the SN change procedure in the wireless network. The I/O interface 501 is coupled with the processor 503 through which an input signal or/and an output signal is communicated. For example, the SCG failure information may be transmitted to the first secondary node element 203-1, via the I/O interface 501. In an embodiment, the primary node element 202 may be implemented in a variety of computing systems, such as a server, a network server, a cloud-based server, and the like.

In an embodiment, the primary node element 202 may configure a timer to hold context of the UE 201 at the first secondary node element 203-1 for a pre-determined time period, during a handover of the UE 201 from the first secondary node element 203-1 to the second secondary node element 203-2. In an embodiment, the timer may be configured once a SgNB reconfiguration process is completed. In the conventional SN change procedure, the context of the UE 201 is released before completion of the random access procedure by the UE 201. The present disclosure enables configuration of the timer at the primary node element 202 for holding the context of the UE 201 at the first secondary node element 203-1, to suspect and avoid failure during future handovers.

Further, the primary node element 202 may be configured to receive the SCG failure information from the UE 201. The SCG failure information indicates a cause of a failure of the handover as a Random Access Channel (RACH) failure. Embodiments of the present disclosure enables the reception of the SCG failure by the first secondary node element 203-1 along with the cause of the failure as the RACH failure, which helps to detect the failure.

Then, the primary node element 202 may transmit the SCG failure information to the first secondary node element 203-1. The first secondary node element 203-1 uses the SCG failure information to suspect that the failure is due to the PCI confusion associated with a PCI of the second secondary node element (203-2) within the pre-determined time period. Further, first secondary node element 203-1 performs a mitigation action during a subsequent handover from the first secondary node element 203-1 to one of the plurality of secondary node elements 203, when a PCI of one of the plurality of secondary node elements 203 is same as the suspected PCI. Embodiments of the present disclosure ensure timely detecting and avoiding failures during the SN change procedure, which increases user experience.

In an embodiment, the primary node element 202 is configured to transmit a request for a Cell Global Identifier (CGI), received from the first secondary node element 203-1, to one of the plurality of UEs. In the present disclosure, the CGI is received from the UE 201 which helps to detect that the failure is due to the PCI confusion and perform the subsequent handover.

In an embodiment, the primary node element 202 is configured to transmit a message to the first secondary node element 203-1, indicating to release the context of the UE

201, after the pre-determined time period. Embodiments of the present disclosure enables delaying of the message transmitted from the primary node element 202 to the first secondary node element 203-1 for the pre-determined time period associated with the timer to enable suspecting that the failure is due to the PCI confusion.

FIG. 6A shows an exemplary flow chart illustrating method steps for detecting the PCI confusion during the SN change procedure in the wireless networks, in accordance with some embodiments of the present disclosure. As illustrated in FIG. 6A, the method 600 may comprise one or more steps. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 601, the SCG failure information may be received from the UE 201, via the primary node element 202. The SCG failure information may be received when the handover from the first secondary node element 203-1 to the second secondary node element 203-2 fails. The UE 201 may perform a random access procedure for handover from the first secondary node element 203-1 to the second secondary node element 203-2, which may fail due to various reasons. Then, the SCG failure information may be received from the UE 201. The SCG failure information may indicate a cause of the failure as a RACH failure.

At step 602, the failure due to the PCI confusion associated with the PCI of the second secondary node element 203-1 may be suspected. The failure may be suspected based on the cause of the failure as the RACH failure. The cause of failure as the RACH failure provides an indication that the failure is due to the PCI confusion. In an embodiment, the failure may be suspected, within a pre-determined time period associated with a timer. In an embodiment, the PCI of the second secondary node element 203-2 may be recorded against the PCI confusion in the NRT of the first secondary node element 203-1.

At step 603, the mitigation action may be performed during a subsequent handover from the first secondary node element 203-1 to one of the plurality of secondary node elements 203, for one of the plurality of UEs in a wireless network. When a request for subsequent handover from the first secondary node element 203-1 to one or the plurality of secondary node elements 203, the PCI of one of the plurality of secondary node elements 203 may be determined to be same as the suspected PCI. Then, a request for a CGI may be transmitted to one of the plurality of UEs. A CGI associated with the suspected PCI may be compared against the received CGI, upon receiving a response from one of the plurality of UEs. The failure may be detected as due to the PCI confusion, when the received CGI is different from the CGI associated with the suspected PCI. Also, a secondary node element corresponding to the CGI may be identified from the plurality of secondary node elements 203. Further, the subsequent handover may be performed from the first secondary node element 203-1 to the secondary node element.

Figure 6B:
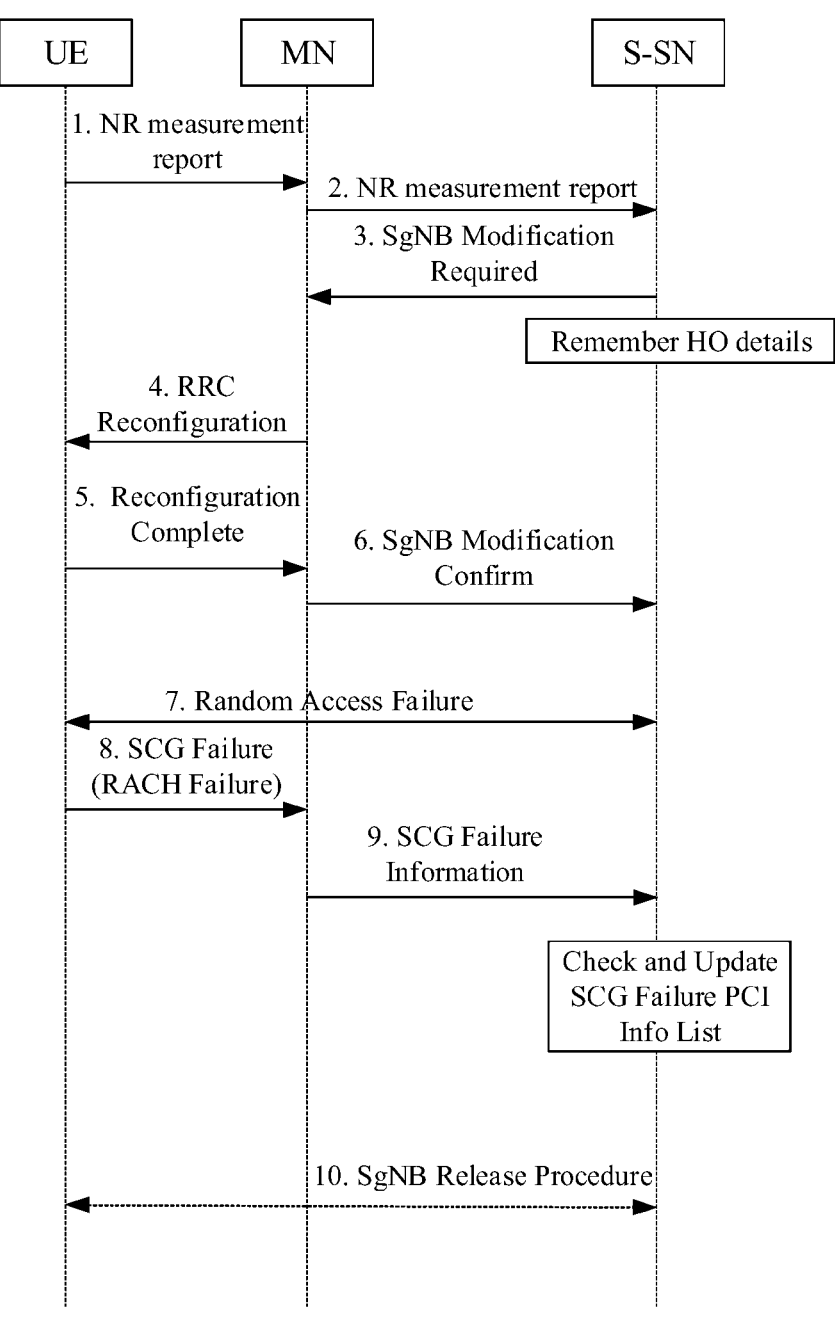
FIG. 6B shows an exemplary illustration for detecting PCI confusion during SN change procedure for intra Centralized Unit (CU) network.

FIG. 6B shows an exemplary illustration for detecting the PCI confusion during the SN change procedure for intra Centralized Unit (CU) network. As shown, the S-SN is able to suspect that the failure is due to the PCI confusion and accordingly record the PCI, to perform the mitigation actions during future handovers.

Computer System

Figure 7:
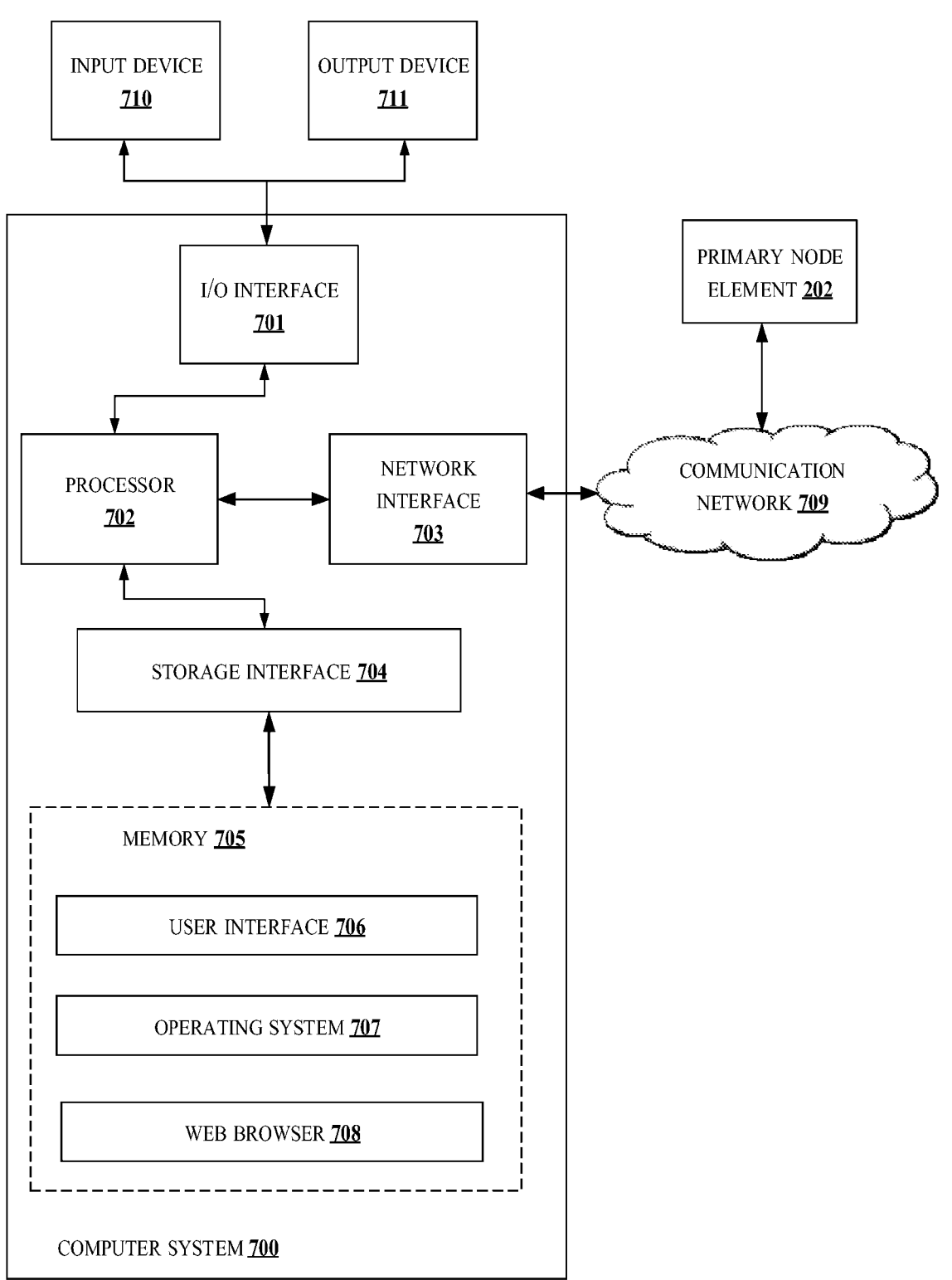
FIG. 7 shows a block diagram of a general-purpose computing system for detecting PCI confusion during SN change procedure in wireless networks, in accordance with embodiments of the present disclosure.

FIG. 7 illustrates a block diagram of an exemplary computer system 700 for implementing embodiments consistent with the present disclosure. In an embodiment, the computer system 700 may be used to implement the first secondary node element 203-1. In an embodiment, the computer system 700 may receive the SCG failure information from the primary node element 202 over a communication network 709. The computer system 700 may comprise a Central Processing Unit 702 (also referred as "CPU" or "processor"). The processor 702 may comprise at least one data processor. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, sensors, etc. The output device 711 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, Bluetooth mesh, Zigbee, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web browser 708 etc. In some embodiments, computer system 700 may store user/application data, such as, the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 700 may implement the web browser 708 stored program component. The web browser 708 may be a hypertext viewing application, for example MICROSOFT® INTERNET EXPLORER™, GOOGLE® CHROME™ O, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBE® FLASH™, JAVASCRIPT™, JAVA™, Application Programming Interfaces (APIs), etc. In some embodiments, the computer system 700 may implement a mail server (not shown in Figure) stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 700 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD (Compact Disc) ROMs, DVDs, flash drives, disks, and any other known physical storage media.

In an embodiment, a first secondary node element 203-1 is disclosed. The first secondary node element 203-1 comprises a processor 303 and a memory 302. The processor is configured to receive a SCG failure information from a UE 201 via a primary node element 202, during a handover of the UE 201 from the first secondary node element 203-1 to the second secondary node element 203-2. The SCG failure information indicates a cause of a failure of the handover as a RACH failure. Further, the first secondary node element 203-1 suspects that the failure is due to a PCI confusion associated with a PCI of the second secondary node element 203-2, based on the cause, within a pre-determined time period associated with a timer configured at the primary node element 202 for holding context of the UE 201 at the first secondary node element 203-1. Thereafter, the first secondary node element 203-1 performs a mitigation action during a subsequent handover from the first secondary node element 203-1 to one of a plurality of secondary node elements 203, for one of a plurality of UEs in a wireless network, when a PCI of one of the plurality of secondary node elements 203 is same as the suspected PCI.

In an embodiment, the processor 303 is configured to request a CGI for performing the subsequent handover, from one of the plurality of UEs, when the PCI of one of the plurality of secondary node elements 203 is same as the suspected PCI. Further, the processor 303 is configured to compare a CGI associated with the suspected PCI against the received CGI, upon receiving a response from one of the plurality of UEs. Furthermore, the processor 303 is configured to detect that the failure is due to the PCI confusion, based on the comparison.

In an embodiment, the processor 303 is configured to perform the mitigation action during the subsequent handover of one of the plurality of UEs by requesting a CGI from one of the plurality of UEs, via the primary node element 202. Further, the processor 303 is configured to identify a secondary node element corresponding to the CGI, from the plurality of secondary node elements 203. Furthermore, the processor 303 is configured to perform the subsequent handover from the first secondary node element 203-1 to the secondary node element.

In an embodiment, the processor 303 is configured to record the PCI confusion against the PCI of the second secondary node element 203-2 in a NRT of the first secondary node element 203-1, upon suspecting that the failure is due to the PCI confusion.

In an embodiment, a primary node element 202 is disclosed. The primary node element comprises a processor 503 and a memory 502. The processor configures a timer to hold context of a UE 201 at the first secondary node element 203-1 for a pre-determined time period, during a handover of the UE 201 from a first secondary node element 203-1 to a second secondary node element 203-2. Further, the processor is configured to receive SCG failure information from the UE 201. The SCG failure information indicates a cause of a failure of the handover as a Random Access Channel (RACH) failure. Furthermore, the processor is configured to transmit the SCG failure information to the first secondary node element 203-1. The first secondary node element 203-1 uses the SCG failure information to suspect that the failure is due to a PCI confusion associated with a PCI of the second secondary node element 203-2 within the pre-determined time period, and perform a mitigation action during a subsequent handover from the first secondary node element 203-1 to one of a plurality of secondary node elements 203, for one of a plurality of UEs in a wireless network, when a PCI of one of the plurality of secondary node elements 203 is same as the suspected PCI.

In an embodiment, a method is disclosed. The method comprises receiving SCG failure information from a UE 201 via a primary node element 202, during a handover of the UE 201 from the first secondary node element 203-1 to a second secondary node element 203-2. The SCG failure information indicates a cause of a failure of the handover as a RACH failure. Furthermore, the method comprises suspecting that the failure is due to a PCI confusion associated with a PCI of the second secondary node element 203-2, based on the cause, within a pre-determined time period associated with a timer configured at the primary node element 202 for holding context of the UE 201 at the first secondary node element 203-1. Furthermore, the method comprises performing a mitigation action during a subsequent handover from the first secondary node element 203-1 to one of a plurality of secondary node elements 203, for one of a plurality of UEs in a wireless network, when a PCI of one of the plurality of secondary node elements 203 is same as the suspected PCI.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6A show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A first secondary node element, comprising:
a memory configured to store instructions executable by a processor; and
the processor configured to execute the instructions stored in the memory and thereby causes the first secondary node element to:
receive Secondary Cell Group failure information from a User Equipment (UE) via a primary node element, during a handover of the UE from the first secondary node element to a second secondary node element, the SCG failure information indicating a cause of a failure of the handover as a Random Access Channel (RACH) failure;
suspect that the failure is due to a Physical Cell Identifier (PCI) confusion associated with a PCI of the second secondary node element, based on the cause, within a pre-determined time period associated with a timer configured at the primary node element for holding context of the UE at the first secondary node element; and perform a mitigation action during a subsequent handover from the first secondary node element to one of a plurality of secondary node elements, for one of a plurality of UEs in a wireless network, when a PCI of the one of the plurality of secondary node elements is same as the suspected PCI of the second secondary node element, wherein the primary node element, the first secondary node element, and the second secondary node element are in a dual connectivity environment.

2. The first secondary node element of claim 1, wherein the processor is configured to, when the PCI of the one of the plurality of secondary node elements is same as the PCI of the second secondary node element:

request a Cell Global Identifier (CGI) for performing the subsequent handover, from one of the plurality of UEs, via the primary node element;

compare a CGI associated with the PCI of the second secondary node element against the received CGI, upon receiving a response from one of the plurality of UEs; and detect that the failure is due to the PCI confusion, based on the comparison.

3. The first secondary node element of claim 1, wherein the processor is configured to perform the mitigation action during the subsequent handover of one of the plurality of UEs by:

requesting a CGI for performing the subsequent handover, from one of the plurality of UEs, via the primary node element;

identifying a secondary node element corresponding to the CGI, from the plurality of secondary node elements; and performing the subsequent handover from the first secondary node element to the secondary node element.

4. The first secondary node element of claim 1, wherein the processor is configured to, upon suspecting that the failure is due to the PCI confusion, record the PCI confusion against the PCI of the second secondary node element in a Neighbor Relation Table (NRT) of the first secondary node element.

5. The first secondary node element of claim 1, wherein the mitigation action comprises the first secondary node requesting a CGI of the one of the plurality of secondary node elements based on identifying that the PCI of the one of the plurality of secondary node elements is same as the PCI of the PCI of the second secondary node element, in order to correctly identify the one of the plurality of secondary node elements for handover.

6. The first secondary node element of claim 1, wherein a PCI of the suspicious secondary cell is recorded as a suspected PCI.

7. A primary node element, comprising:

a memory configured to store instructions executable by a processor; and the processor configured to execute the instructions stored in the memory and thereby causes the primary node element to:

configure a timer to hold context of a User Equipment (UE) at the first secondary node element for a pre-determined time period, during a handover of the UE from a first secondary node element to a second secondary node element;

receive Secondary Cell group (SCG) failure information from the UE, the SCG failure information indicating a cause of a failure of the handover as a Random Access Channel (RACH) failure; and transmit the SCG failure information to the first secondary node element, wherein the first secondary node element uses the SCG failure information to suspect that the failure is due to a Physical Cell Identifier (PCI) confusion associated with a PCI of the second secondary node element within the pre-determined time period, and perform a mitigation action during a subsequent handover from the first secondary node element to one of a plurality of secondary node elements, for one of a plurality of UEs in a wireless network, when a PCI of the one of the plurality of secondary node elements is same as the PCI of the second secondary node element.

8. The primary node element of claim 7, wherein the processor is configured to transmit a request for a Cell Global Identifier (CGI), received from the first secondary node element, to one of the plurality of UEs.

9. The primary node element of claim 7, wherein the processor is configured to transmit a message to the first secondary node element, indicating to release the context of the UE, after the pre-determined time period.

10. A method, comprising:

receiving, by the first secondary node element, Secondary Cell Group (SCG) failure information from a User Equipment (UE) via a primary node element, during a handover of the UE from the first secondary node element to a second secondary node element, the SCG failure information indicating a cause of a failure of the handover as a Random Access Channel (RACH) failure;

suspecting, by the first secondary node element, that the failure is due to a Physical Cell Identifier (PCI) confusion associated with a PCI of the second secondary node element, based on the cause, within a pre-determined time period associated with a timer configured at the primary node element for holding context of the UE at the first secondary node element; and performing, by the first secondary node element, a mitigation action during a subsequent handover from the first secondary node element to one of a plurality of secondary node elements, for one of a plurality of UEs in a wireless network, when a PCI of the one of the plurality of secondary node elements is same as the PCI of the second secondary node element, wherein the primary node element, the first secondary node element, and the second secondary node element are in a dual connectivity environment.

11. The method of claim 10, when the PCI of the one of the plurality of secondary node elements is same as the PCI of the second secondary node element, comprising:

requesting a Cell Global Identifier (CGI) for performing the subsequent handover, from one of the plurality of UEs, via the primary node element;

comparing a CGI associated with the PCI of the second secondary node element against the received CGI, upon receiving a response from one of the plurality of UEs; and detecting that the failure is due to the PCI confusion, based on the comparison.

12. The method of claim 10, wherein performing the mitigation action during the subsequent handover of one of the plurality of UEs comprising:

requesting a CGI for performing the subsequent handover, from one of the plurality of UEs, via the primary node element;

identifying a secondary node element corresponding to the CGI, from the plurality of secondary node elements; and performing the subsequent handover from the first secondary node element to the secondary node element.

13. The method of claim 10, upon suspecting that the failure is due to the PCI confusion, comprising:

recording the PCI confusion against the PCI of the second secondary node element in a Neighbor Relation Table (NRT) of the first secondary node element.

14. A non-transitory computer readable medium including instructions for performing operations comprising:

receiving Secondary Cell Group (SCG) failure information from a User Equipment (UE) via the primary node element, during a handover of the UE from a first secondary node element to a second secondary node element, the SCG failure information indicating a cause of a failure of the handover as a Random Access Channel (RACH) failure;

suspecting that the failure is due to a Physical Cell Identifier (PCI) confusion associated with a PCI of the second secondary node element, based on the cause, within a pre-determined time period associated with a timer configured at the primary node element for holding context of the UE at the first secondary node element; and performing a mitigation action during a subsequent handover from the first secondary node element to one of a plurality of secondary node elements, for one of a plurality of UEs in a wireless network, when a PCI of the one of the plurality of secondary node elements is same as the PCI of the second secondary node element, wherein the primary node element, the first secondary node element, and the second secondary node element are in a dual connectivity environment.

15. The medium of claim 14, when the PCI of the one of the plurality of secondary node elements is same as the PCI of the second secondary node element, comprising:

requesting a Cell Global Identifier (CGI) for performing the subsequent handover, from one of the plurality of UEs, via the primary node element;

comparing a CGI associated with the PCI of the second secondary node element against the received CGI, upon receiving a response from one of the plurality of UEs; and detecting that the failure is due to the PCI confusion, based on the comparison.

16. The medium of claim 14, wherein performing the mitigation action during the subsequent handover of one of the plurality of UEs comprising:

requesting a CGI for performing the subsequent handover, from one of the plurality of UEs, via the primary node element;

identifying a secondary node element corresponding to the CGI, from the plurality of secondary node elements; and performing the subsequent handover from the first secondary node element to the secondary node element.

17. The medium of claim 14, upon suspecting that the failure is due to the PCI confusion, comprising:

recording the PCI confusion against the PCI of the second secondary node element in a Neighbor Relation Table (NRT) of the first secondary node element.

* * * * *